US005335818A

United States Patent [19]

Maldanis et al.

[11] Patent Number: 5,335,818

[45] Date of Patent: Aug. 9, 1994

[54] COLD DRINK VENDING MECHANISM

[75] Inventors: Algert J. Maldanis, Heath, Tex.; Robert I. Courts, Caledonia, Mich.; Dennis Dutkevitch, Clifton; David J. Mooney, Flanders, both of N.J.

[73] Assignee: C-Power Companies, Inc., Rockwell, Tex.

[21] Appl. No.: 71,641

[22] Filed: Jun. 3, 1993

[51] Int. Cl.[5] .................... G07T 11/00; B65G 59/00

[52] U.S. Cl. .................... 221/131; 221/193; 221/195; 221/298; 49/94; 49/109

[58] Field of Search .................... 221/289, 298, 131, 191, 221/193, 194, 195; 49/94, 109; 312/291, 271

[56] References Cited

U.S. PATENT DOCUMENTS

| | | | |
|---|---|---|---|
| D. 206,399 | 12/1966 | Reichow | D52/3 |
| D. 316,568 | 4/1991 | Koch | D20/8 |
| D. 316,728 | 5/1991 | Koch | D20/8 |
| 2,604,371 | 7/1952 | Smiley et al. | 312/97 |
| 2,671,001 | 3/1954 | Ossanna,Jr. | 312/36 |
| 2,679,143 | 5/1954 | Helsing | 62/102 |
| 2,956,660 | 10/1960 | Nordquist | 221/193 |
| 3,064,856 | 11/1962 | Council | 221/150 R |
| 3,158,246 | 11/1964 | Murphy | 194/1 |
| 3,397,763 | 8/1968 | Wahlberg | 194/4 |
| 3,834,427 | 9/1974 | Morton | 221/298 |
| 4,289,254 | 9/1981 | Spring | 221/298 |
| 4,296,872 | 10/1981 | Mitchell et al. | 312/291 |
| 4,347,952 | 9/1982 | Bookout | 221/129 |
| 4,405,059 | 9/1983 | Kull | 221/298 |
| 4,676,398 | 6/1987 | Kokubun et al. | 221/131 |
| 4,682,709 | 7/1987 | Brandes et al. | 221/2 |
| 4,730,750 | 3/1988 | Ficken | 221/124 |
| 4,913,313 | 4/1990 | Rockola | 221/131 |
| 5,176,288 | 1/1993 | Craven | 221/131 |

FOREIGN PATENT DOCUMENTS

| | | | |
|---|---|---|---|
| 0105600 | 8/1979 | Japan | 221/131 |
| 4-291494 | 10/1992 | Japan | 221/131 |

OTHER PUBLICATIONS

Brochure of Rowe International, Inc. "Genesis TM. The Look of the Future from Rowe. ®"

Brochure for RMi 850 Series.

Brochure for Snackshop 6000XL Series.

Brochure for RMi 2000 Series.

Brochure for Cold Drink MDM SL26.

Advertisement of Friteco, Inc. for french fries, Vending Times p. 38, Mar. 1988.

Advertisement for cold drink vending machine which appeared in "Vending Times," Sep. 1987, p. 2.

*Primary Examiner*—H. Grant Skaggs

*Attorney, Agent, or Firm*—John W. Montgomery

[57] ABSTRACT

A vending mechanism for a cylindrical article dispenser of a type having a column of stacked cylindrical articles moved along a dispensing pathway by a force, such as by the force of gravity, is disclosed, which has an escapement mechanism which is attachable in operative alignment with a vending pathway of a column of stacked cylindrical articles. An upstream arm is pivotably attached in the escapement mechanism, having a first position blocking a portion of the vending pathway and having a second position retracted from the vending pathway to allow cylindrical articles to move past the upstream arm. A downstream arm is pivotably attached in the escapement mechanism, having a first position blocking a portion of the vending pathway and having a second position retracted from the vending pathway to allow cylindrical articles to move past the downstream arm. A first rotary cam is rotatably attached in the escapement mechanism and has a profile shape for moving the upstream arm between its first and second positions. A second rotary cam is coaxially rotatable with the first cam and has a profile shape for moving the downstream arm between its second position and its first position. The first and second rotatable cams have their profile shapes offset with respect to each other so that the upstream arm is moved into its blocking position only when the downstream arm is also in its blocking position, and so that the downstream arm is moved into or out of its blocking position only when the upstream arm is in its blocking position, such that co-rotation of the cams does not act to raise either the upstream or the downstream arm against the force which causes the column to move along the dispensing pathway.

19 Claims, 8 Drawing Sheets

COLD DRINK VENDING MECHANISM

CROSS-REFERENCE TO RELATED APPLICATIONS

This application is related to a co-pending and co-owned United States Patent Application entitled "Cold Drink Vending Machine with Window Front Panel" filed concurrently herewith.

TECHNICAL FIELD OF THE INVENTION

The present invention relates to a vending mechanism by which cylindrically shaped articles may be selectably released one at a time from an outlet of a rack or track in which a plurality of similarly shaped cylindrical articles are stacked vertically or in a serpentine fashion. The present invention also relates to a vending machine having temperature controlled products vended into a consumer accessible tray, and more particularly, to a consumer-operated access door for retrieving vended cold drink containers from a refrigerated cold drink container holding area.

BACKGROUND OF THE INVENTION

In the past, cold drink vending machines which dispense cold drink containers upon payment of a fee have been primarily of the type in which exterior advertising for the type of cold drink products dispensable from the vending machine were separately displayed on the exterior of the vending machine. For example, U.S. Pat. No.4,682,709 issued to Brandes, et al., discloses a beverage container-dispensing machine in which the sign panel contains a product identifying logo corresponding to at least one type of the beverage cans to be dispensed. The individual flavor or type of cold drink is indicated on smaller panels associated with dispensing buttons. Examples of these types of dispensers which also include serpentine tracks for storing and dispensing cylindrical articles, such as cold drink cans, include U.S. Pat. Nos.4,347,952 issued to Bookout in 1982, U.S. Pat. No. 4,730,750 issued to Ficken in 1988, and U.S. Pat. No. 4,913,313 issued to Rockola in 1990. The Ficken patent, No. 4,730,750 includes a window for viewing articles other than the refrigerated cold drinks. The refrigerated cold drinks are stored within the cabinet in a separately closed refrigerated area. The types of cold drinks to be dispensed are presented on separate display panels associated with the various serpentine tracks.

Bottled beverage vending machines have also been disclosed in which a small window panel is provided by which only the bottle caps can be viewed. For example, U.S. Pat. No. 2,679,143 issued to Helsing in 1954 has inclined racks on which the bottles are stored, which move the bottles to the bottle cap viewing and dispensing area by the rolling force of gravity.

Refrigerated product vending machine having window panels through which the products can be viewed have also been previously disclosed for products such as apples in U.S. Pat. No. 2,604,371 issued to Smiley, et al. in 1952.

Some of the advantages of a view-through dispensing machine for temperature controlled cylindrical containers were recognized and disclosed in U.S. Pat. No. 2,671,001 issued to Ossanna, Jr. in 1954. However, the cylindrical containers were vertically stacked so that they did not include the advantages of a serpentine track for cold drink can dispensing. Further, when this device was depleted for a particular vertical stack of cylindrical articles, it no longer indicated to the potential customer the types of articles which might be obtained when the cabinet was refilled. A precooling storage area was not provided so that a time lag would exist between filling the machine with uncooled product containers and the time at which they could be dispensed at a cool temperature. For these reasons, the temperature controlled vending machine with a glass front as set forth previously was not well suited for cold drink can dispensing.

There are some vending machines, such as cold drink vending machines, in which cylindrically shaped articles and in particular, cold drink containers, bottles, and especially cans are stored in vertical racks or serpentine racks. The articles fall or roll by the force of gravity toward the bottom of the rack. In the past, dispensing one cylindrical article at a time in response to payment and selection actuation, has been accomplished through the use of a rocker arm arrangement having a central trough sized to hold one can, with ears at either end. The arm pivots at the central trough so that either ear can be alternately moved into the path of the cans. In operation, the arm pivots in one direction to allow the column of cold drinks to roll by the force of gravity so that the lowest can in the column is pushed into the trough against the lower ear. The arm then pivots in the other direction to force the upper ear against the weight of the column and to simultaneously allow the lowest cold drink can to fall free into a dispensing area. Upon rocking into the can dispensing position, the upper ear necessarily moves against the entire weight of the column of cold drink cans, thereby holding them upward in place while the trough held can is dispensed. Prior to dispensing the next can, the rocker arm pivots back to its first position allowing the column of cans to drop down, forcing, the lowest can into the trough and against the lower ear of the rocker arm. The cycle is repeated to dispense the next can. To facilitate moving the rocker arm against the column, the ears were rounded for insertion between the lowest can and the next can in the vertical column thereabove. This helped make the operation smoother but did not totally eliminate the large amount of power required to move the rocker arm ears against the weight of a full column of cans. These prior mechanisms had to be constructed with sufficient strength to allow repeated operation of the rocker arm from one pivot position to the next while providing sufficient force to move against the entire weight of the column of cans in the track thereabove.

In prior vending machines in which temperature controlled products, such as cold drink containers were vended, the vending chute through which the cold drinks were dispensed was also a conduit through which cold air escaped, thereby requiring additional energy for maintaining the temperature control storage area. Some cold drink vending machines were constructed with access through the top so that the cold denser air tended to remain within the vending area. Other vending machines provided only small openings through which the cold drinks were dispensed, thereby minimizing the exposure. Sometimes, the areas were provided with a flexible shield which tended to reduce heat exchange by convection, but did little to reduce the heat exchange caused by conduction.

In multiple column cold drink dispensers of the type with a plurality of horizontally spaced vertical columns or tracks of cold drinks, a springloaded door was provided across the area through which the cans were dispensed. Sometimes the weight of a single cold drink can was insufficient to actuate the door. The door was intended to be actuated by the weight of a cold drink dispensed thereagainst so that it pivoted to an open position allowing the cold drink to fall into a chute from which it could be retrieved by the consumer. Often, the weight of the door and the tension of the spring was balanced against the force normally applied by a cold drink. When the amount of friction pivoting the door was increased, as by a ruptured can, a broken bottle, or an otherwise spilled cold drink, the force provided by the weight of a can was insufficient to open the door and the machine would become jammed.

SUMMARY OF THE INVENTION

The disadvantages of prior cold article vending machines as applied to cold drink container vending machines have been overcome by the present invention which provides a cold drink container vending machine having serpentine vending tracks for guiding vendable containers through a refrigerated case and having a transparent front window panel through which the cold drink containers are viewed from the outside of the vending machine. Further, there are storage racks inside the case adjacent to the front window panel for holding pre-cooled cold drink containers, which remain visible for advertising purposes even after the vendable containers are depleted.

According to another aspect of the present invention, a plurality of separate serpentine tracks are vertically stacked so that separate tracks may be activated by separate selection entries with one or more buttons on a control panel. Alternatively, selection entry on the control panel may activate both an upper and a lower vertically stacked serpentine track in appropriate sequence such that both tracks are depleted with the same entry, so that the capacity for a particular type of cold drink may be increased and is dispensable with a single selection entry. With both options available, the versatility of a single vending machine is increased and differences in popularity of types of cold drinks can be accommodated by having popular cold drinks in both upper and lower vertical tracks.

According to a further aspect of the invention, the serpentine tracks are uniquely formed for holding cold drink containers which are cylindrical cans. Pairs of oppositely facing vertical partitions are provided on which mirror image shallow channels are formed. The cans are supported at opposite ends of the cans between the oppositely facing shallow channels formed in the partitions. The partitions are supported inside the refrigerated case and a uniform distance between the channels is maintained with uniformly sized horizontally disposed spacing struts to form an array of side-by-side vertical serpentine tracks.

According to one aspect of the invention, the glass front window, through which the cold drinks are visible, is maintained free of condensation which might otherwise obscure visibility. Preferably, the glass front is formed of a thermal insulated window with the surface of one sheet of window glass coated with an electrically heated sheet of plastic. Alternatively, additional sheets of glass forming a multi-pane window serve to reduce condensation. A border around the front door of the machine may be heated with an electrical resistance wire to prevent condensation around the door seal.

According to yet another aspect of the invention, a simplified set of brackets are formed on the inside of the front panel door to prevent the cold drink containers from impacting the glass front window if the machine is tipped.

The present invention overcomes other drawbacks of the prior art by providing a cylindrical article vending mechanism, which is positionable below and adjacent to a track containing a column of a plurality of cylindrical articles, such as cold drink cans. The mechanism includes a first arm having a portion thereof which is pivotable between a blocking position in the path of the cylindrical products and a release position out of the path of the cylindrical products. A first rotatable cam actuates the first arm from the blocking position to the release position. The vending mechanism also includes a second pivotable arm having a portion thereof which is pivotable between a block position in the path of the rolling cylindrical products and a release position out of the product path. The second pivotable arm is located a distance corresponding to the diameter of one cylindrical article, below the first arm. The second pivotable arm is actuated from the blocking position to the release position with a second rotatable cam. The first and second cams have elliptical profile shapes which are rigidly affixed at offset rotary positions to a drive shaft, such that the second arm is only moved to a release position when the first arm is in a blocking position. The second arm moves to its blocking position after it releases one can and before the first arm retracts. The first arm is moved to its release position only when the second arm is in its blocking position. The first arm then moves into its blocking position while the second arm is in its blocking position. In this fashion, the cams never lift the arms against the entire weight of the column. The arms are each moved into blocking positions only when the other is already statically holding the weight of the column. The rotational power requirement of the motor is very low because the weight of the column need not be lifted through motor rotation.

According to another feature of the invention, the vending mechanism is conveniently removable from the vending machine for service. It is reinserted into a fixed rigid position using a unique sliding clip-in arrangement without traditional threaded fasteners. Further, a manually actuated blocking lever is positioned above the vending mechanism so that the column of cylindrical articles can be held in place while the vending mechanism is removed, serviced, or replaced.

Applicant has discovered that rather than providing a single elongated door covering all outlets of vending columns, the ability of individual cans to actuate the doors against the mass of the doors can be facilitated by segmenting the elongated door into individual pivoting doors at the lower end of each cold drink track.

In a particularly preferred embodiment, a continuous elongated door comprising rigid surface layers and interior insulation can be used to block the openings between the insulated chamber and the outlet chute. The door is mechanically engaged with an exterior door for access into the chute, so that pushing the exterior door actuates the insulated door to allow the can to fall into the chute for access by the consumer. In this manner, substantial insulation is achieved and the consumer provides the force which can be substantially greater than the weight and inertia of a rolling can to open the door, thereby avoiding inoperability due to sticking doors.

BRIEF DESCRIPTION OF THE DRAWINGS

These and other objects and advantages of the invention will be more fully understood with reference to the following description, claims, and drawings in which like numerals represent like elements and in which:

DETAILED DESCRIPTION OF THE PREFERRED EMBODIMENTS

Figure 1:
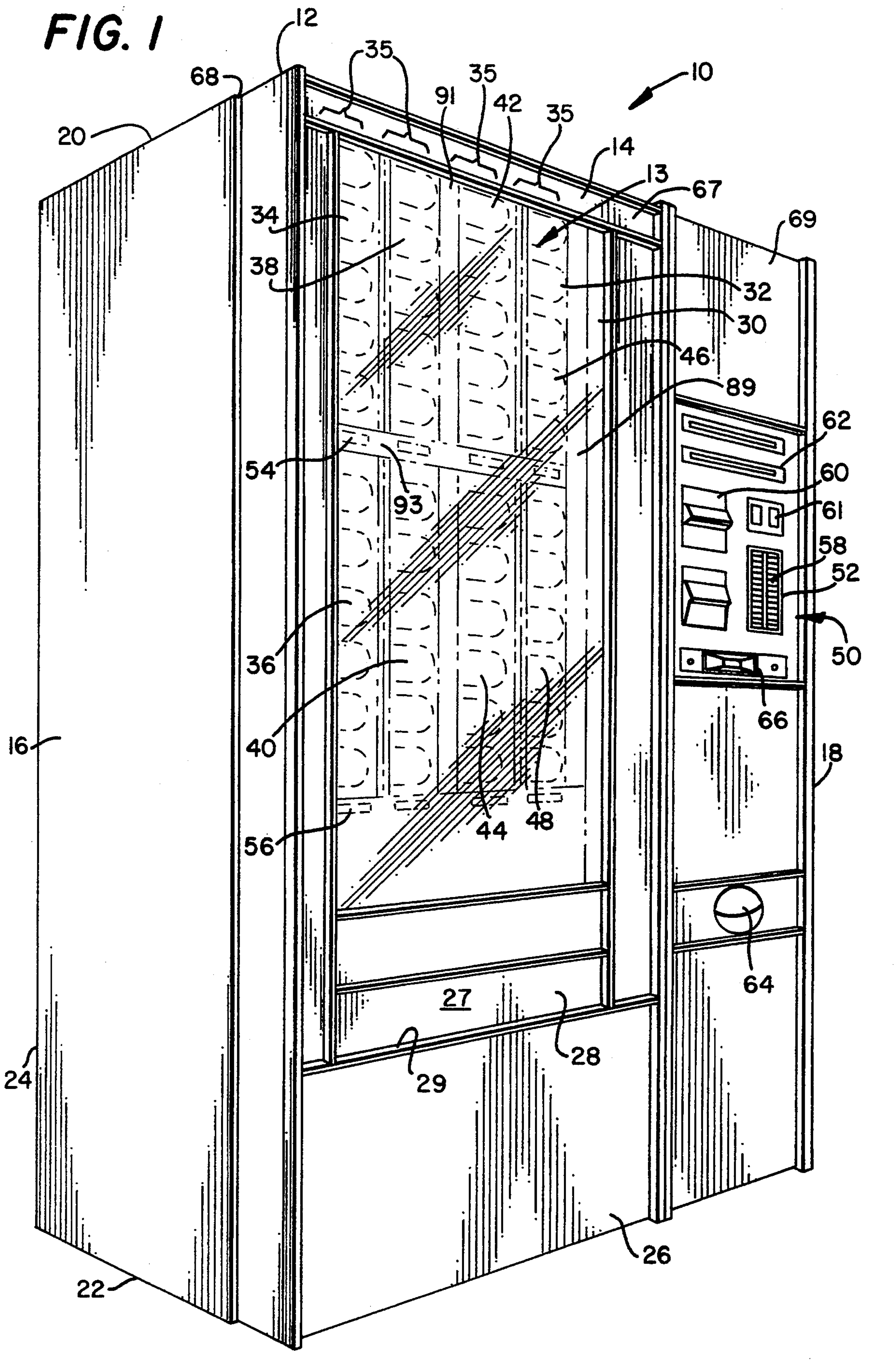
FIG. 1 is a perspective view of a cold drink vending machine with a view-through front window panel according to the present invention.

FIG. 1 is a perspective view of a cold drink container vending machine 10. The vending machine 10 includes a refrigerated case 12 having a front 14, a left side 16, a right side 18, a top 20, a bottom 22, and a back 24. The front includes a lower panel portion 26 in which a cold drink container dispensing area 28 is located. The dispensing area 28 may be an opened shelf, but preferably includes an openable door 27 covering an opening 29 behind which the dispensing area 28 is located. The front 14 further advantageously includes a transparent window panel 30 extending substantially from side to side and substantially from the top to the lower panel portion 26 at which the dispensing area 28 is located.

The transparent window panel 30 allows potential consumers of cold drinks or customers who may wish to purchase a cold drink which is dispensed in a container from the vending machine 10 to view actual cold drink containers 32 which will be dispensed or vended.

Particularly advantageous where the cold drink containers 32 are standard size cylindrical cold drink containers 32, a plurality of side-by-side serpentine tracks 35 are formed and positioned inside of the refrigerated case 12 to hold and to guide the cans through the refrigerated area 13 to the dispensing area 28. Tracks 35 preferably include a first upper track 34, which is vertically above a first lower vertical track 36. While any desired number of aligned upper and lower vertical tracks may be included, the embodiment depicted in FIG. 1 also includes a second upper vertical track 38 and a corresponding second lower vertical track 40, a third upper vertical track 42, and a corresponding third lower vertical track 44, and a final upper vertical track 46 and a final lower vertical track 48. The first upper and lower vertical tracks are adjacent the left side 16 of the case 12 when viewed from the front and the final, upper and lower vertical tracks 46 and 48 are adjacent the right side 18 of the case 12 when viewed from the front.

A container selection means, designated generally as 50, is provided which includes a control panel 52 and track indicator 54 which is vertically aligned with one of the vertical tracks. In the embodiment shown, track indicator 54 corresponds to the first upper vertical track and a lower selection indicator 56 corresponds to the first lower vertical track. For selection of a desired cold drink which may be seen in one of the tracks, the control panel 52 has buttons or keys 58 having associated indicia corresponding to the track indicators 54 or 56. Upon depositing money in receiving slots 60 or 61, the value of the money may be displayed at a display 62 which when it equals or exceeds a predetermined price for the desired selection, a selected cold drink is dispensed upon making a selection entry by depressing one or more keys or buttons 58 corresponding to the selection indicator. If the value deposited exceeds the amount required for the purchase, then change is returnable at change return 64.

Figure 2:
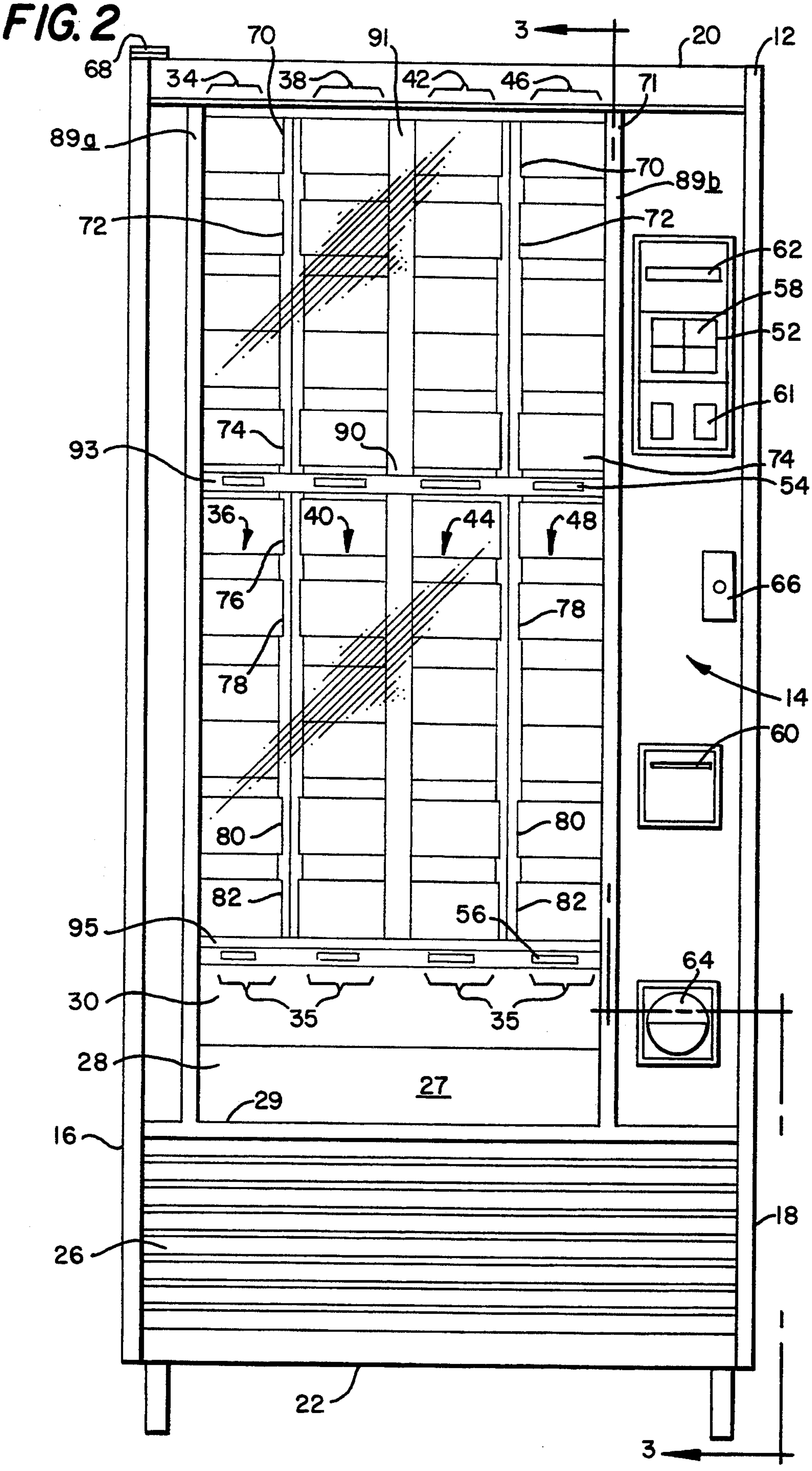
FIG. 2 is a partial front elevation view of an upper portion of a cold drink vending machine with a view-through front window panel according to the present invention with an alternative exterior appearance and control panel arrangement.

FIG. 2 depicts a front elevation view of one alternative embodiment of a cold drink can vending machine according to the present invention. Front 14 of the case 12 can be opened by disengaging latch 66, which may be key operated lock 66 for security purposes, and by pivoting the front 14 about a hinge 68. This provides a convenient means for refilling one or more of the serpentine tracks 35 with cold drink cans 32. Preferably, as shown in the embodiment shown in FIG. 1, a door portion 67 of front 14 on which window panel 30 is mounted, pivots separately from a control panel portion 69 of front 14. However, as shown in FIG. 2, a control panel may also be integrally formed on a door 71 so that both the window panel 30 and the control panel 52 pivot about hinge 68.

Figure 3:
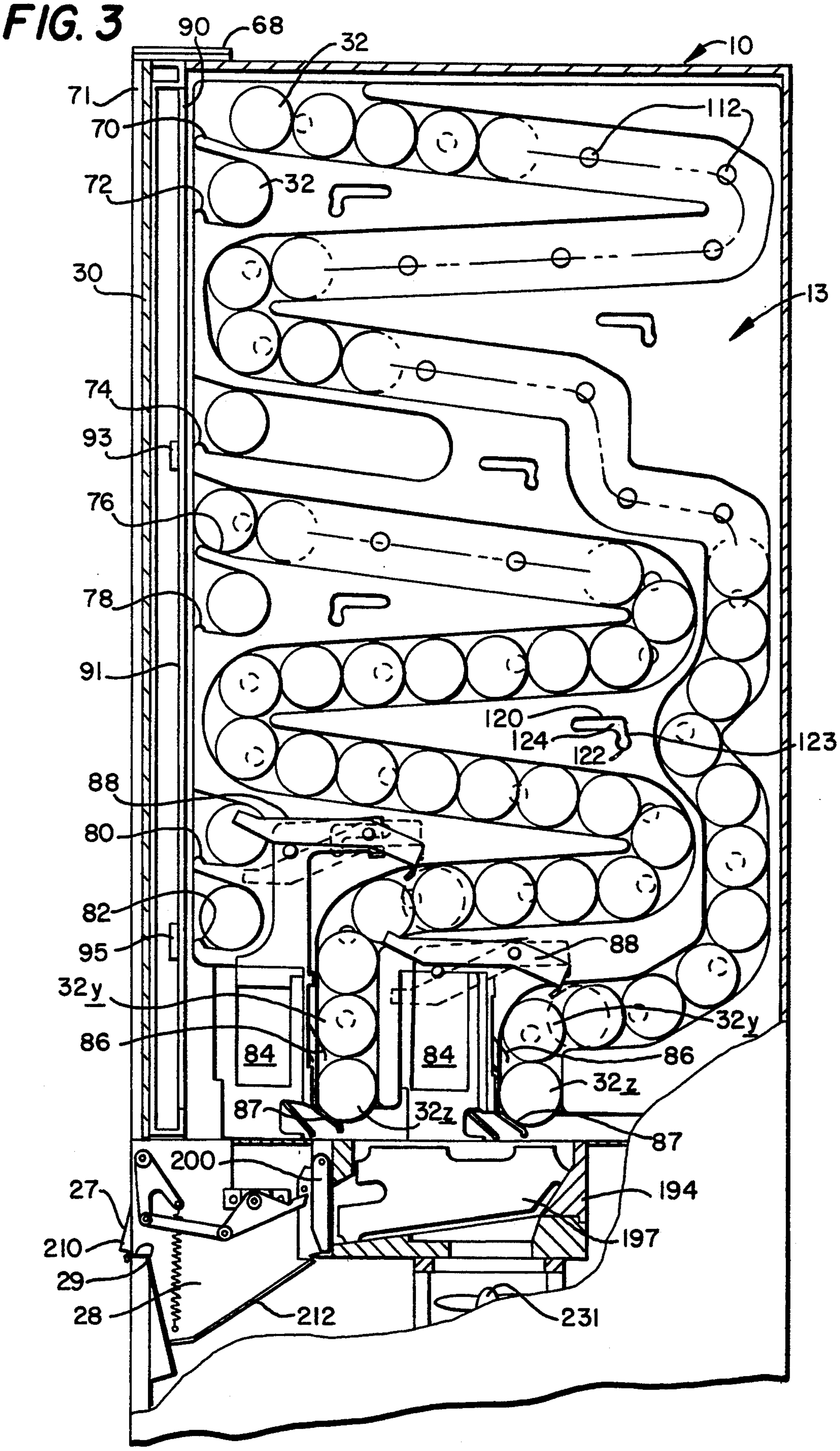
FIG. 3 is a side partial section view taken along section line 3—3 of FIG. 2 depicting an upper portion of a vending machine showing the unique arrangement of vertically stackable serpentine vending tracks and pre-cooled storage racks associated with each separate serpentine track.

FIG. 3 depicts a partial cross-sectional view of the cold drink dispenser of FIG. 2 taken along section line 3—3. With reference to FIGS. 2 and 3 simultaneously, the interior configuration of the cold drink storage area will be more fully understood. The interior structure shown is substantially the same for the embodiment depicted in FIG. 1. An upper serpentine track 70 receives cold drink containers 32, which are preferably cylindrical cans 32 and guides them as they roll downward along serpentine track 70 propelled by the force of gravity. There is a first pre-cooled can storage rack 72 and a second pre-cooled storage rack 74 which are preferably located adjacent the transparent front window panel 30 so that they may be continuously viewed from outside of the cold drink can dispenser 10. The cans in serpentine track 70 can also be viewed (when present) through front window panel 30. A lower serpentine track 76 receives, holds and guides cold drink cans 32 in a similar fashion so that they may be viewed through transparent window panel 30. Additional cold drink pre-cooled storage racks 78, 80 and 82 are further provided in vertical alignment with lower serpentine track 76. Connected at the bottom of serpentine track 70 is an escapement mechanism 84 which is operatively actuated through control panel 52 to dispense a cold drink container into dispensing area 28. The desired or selected type of cold drink is viewed in the serpentine track 70, the track indicator 54 is also viewed and the selection is made by depressing entry selection buttons or keys 58 with corresponding indicia. Arms 86 and 87 of mechanism 84 are appropriately activated in sequence to allow can 32 to move one at a time into the dispensing area 28 where it can be removable from openable door 27 by the consumer. A hold back lever 88 is also provided at each track which is manually pivotable to block the cans in the track above the escapement mechanism 84 so that the escapement mechanism 84 may be removed, replaced, or otherwise worked on without discharging all of the cans from the track.

The glass front window 30 through which the cold drink containers 32 are visible is preferably maintained free of condensation which might otherwise obscure visibility. Preferably, glass front 30 is formed of a thermally insulated window, such as two panes of glass sealed around the perimeter with a vacuum created between the two panes. Also preferably, the surface of one pane of window glass is coated with an electrically heated transparent sheet. Alternatively, additional panes of glass forming a multi-pane window may serve to reduce condensation. A border around the front door of the machine may be heated with an electrically resistant wire to prevent condensation around the door seal.

Also depicted in FIG. 3 (and also in FIGS. 2 and 4), is a can holding grid 90 attached to the door 71 (or attached to door 67 in FIG. 1) to prevent the cans from escaping from the tracks if the machine is tipped. The grid 90 has vertical side runners **89*a* and 89*b* at either side which are each sufficiently narrow to allow a clear view of the cold drink can 32, yet sufficiently wide to overlap one end of cold drink cans 32 by a small amount. Closing door 71 ( closing door 67 of FIG. 1) positions vertical side runners, 89*a* at the left and 89*b* at the right, immediately adjacent the front of the tracks. Thus, upon tilting or tipping of the machine, the overlap prevents the cans from escaping from the upper track openings by which the tracks are filled with cans. Similarly, grid 90 includes a middle vertical runner 91 which overlaps ends of cans in two side-by-side middle tracks. If more than four total tracks are constructed, an additional middle runner 91 will be required for each two additional tracks. The price indicia can be removably inserted into horizontal cross bars 93 and 95 of the grid 90** immediately below each track.

Figure 4:
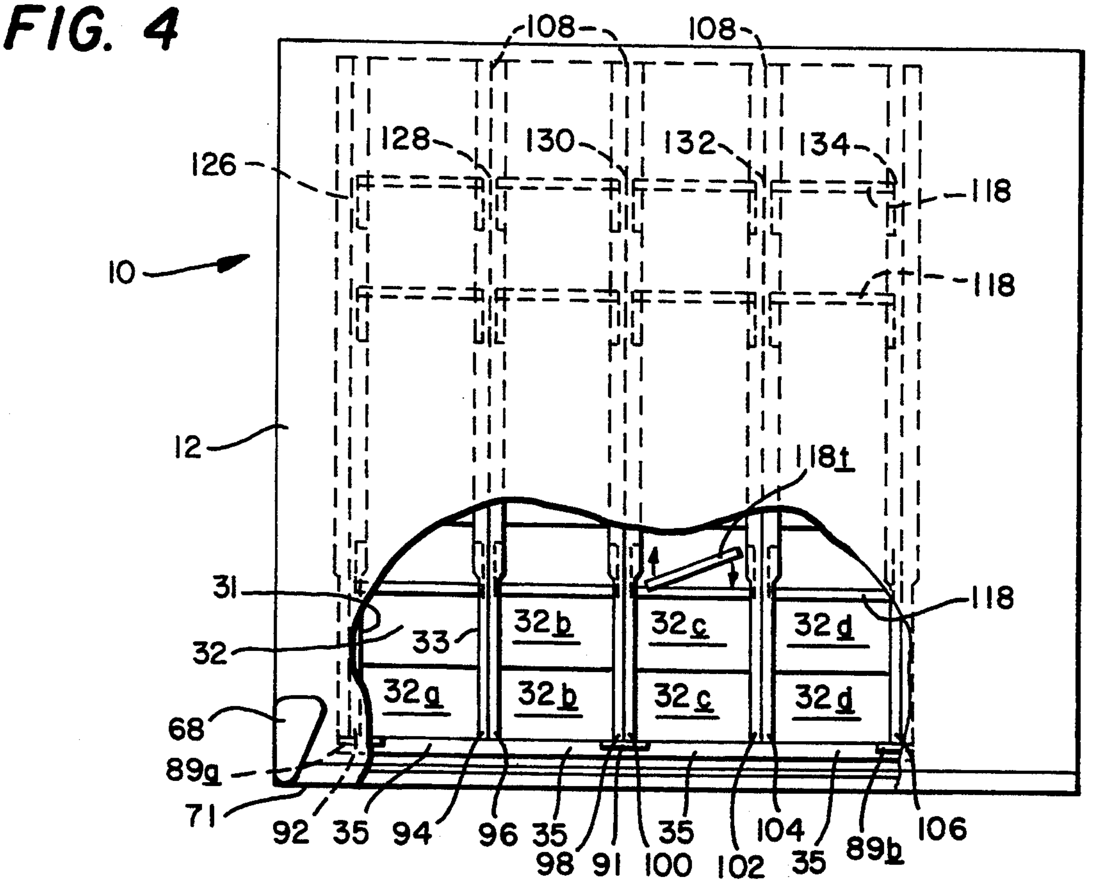
FIG. 4 is a partial cut-away top view depicting an embodiment of the unique arrangement and construction of serpentine tracks within a cold drink vending machine according to the present invention.

FIG. 4 is a partial cut-away top view depicting the plurality of serpentine tracks 35 within the cold drink vending machine 10. Each separate track holds a predetermined number of cold drink cans 32 depending upon the diameter of the cold drink container and the length of the track. Each track may be filled with a different kind of cold drink **32*a*, *b*, *c*, or *d*. However, the cans will be the same and the construction will be described with reference to a single cold drink can 32 having ends 31 and 33 spaced apart a standard predetermined distance depending upon the size of cold drink cans to be vended. The tracks are formed with a plurality of oppositely facing left and right partitions. As depicted in FIG. 4, the first vertical track is formed with a first left partition 92 and an opposed first right partition 94. The second track is formed with a second left partition 96 and a second right partition 98. The third track is formed with a third left partition 100 and a third right partition 102 and the final track is formed with a final left partition 104 and opposed final right partition 106**.

Figure 5:
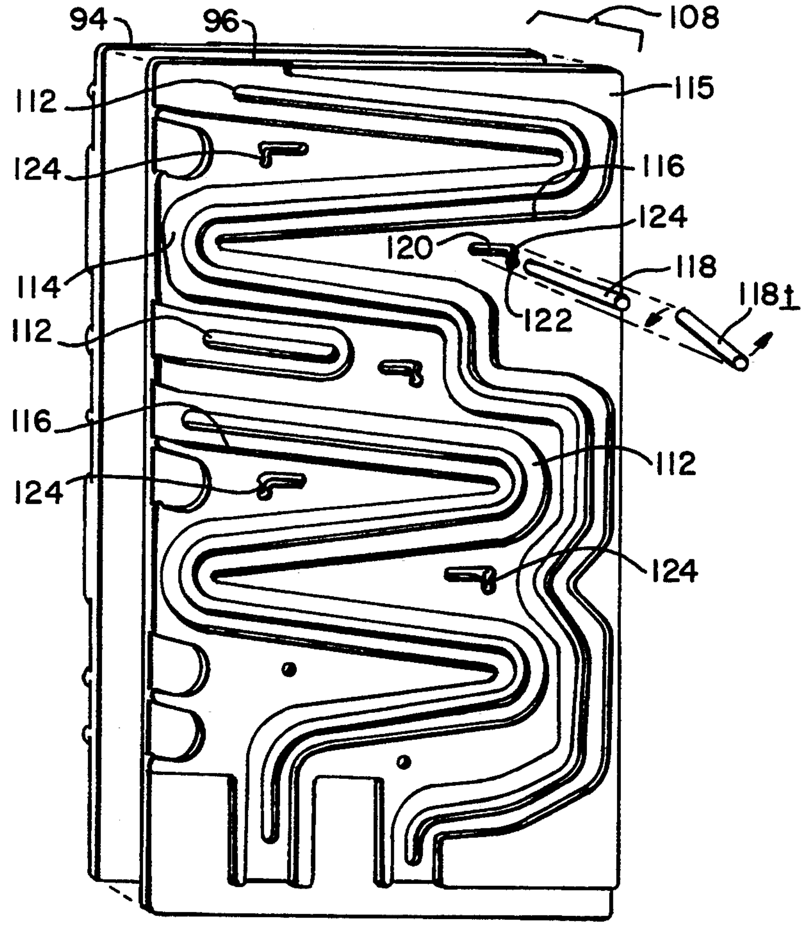
FIG. 5 is a perspective view of the construction of a pair of serpentine track end forming partitions which are welded together for use in the simplified durable construction of the cold drink vending machine according to the present invention.

FIG. 5 is a schematic perspective view of a wall assembly 108 which is typical for each of the plurality of wall assemblies 108 (shown in FIG. 4) which are formed by connecting first right partition 94 to second left partition 96, second right partition 98 to third left partition 100, and third right partition 102 to final left partition 104. The first left partition 92 may be attached to an unused right partition to form a wall 108, or alternatively, first left partition 92 may stand alone. It may be attached to a flat sheet of material for additional support. Alternatively, it might be abutted against and connected to an interior surface of case 12 for additional stability. Similarly, the final right partition 106 may stand alone, may be attached to an unused left partition, may be attached to a flat sheet of material, or may be attached to the interior wall of the case 12.

In FIG. 5, a right partition 94 and a left partition 96 are shown, to demonstrate a preferred construction, which construction is also applicable for other right and left partitions which form a plurality of walls 108 in the refrigerated vending machine. The partitions are joined back to back with joints 112, which are preferably a continuous strip of bonding as in FIG. 5, but which may also be a series of spot bonds as shown in FIG. 3. Joints 112 are preferably positioned in channel bottoms 114 between the channel edges 116 and around the perimeter 115 of the partitions. The joints 112 are flush with or depressed slightly below channel bottoms 114 so that they do not interfere with rolling of cans 32 supported at ends 31 and 33 by channel edges 116. It has been found that the continuous strip of bonding advantageously avoids flat areas between spot bonds which can cause binding if cans 32 tilt as they roll along tracks 35.

In a preferred embodiment, the partitions 92, 94, 96, 98, 100, 102, 104 and 106 are constructed of plastic, such as ABS, polyethylene, PVC or structural foam because of their light weight and ease of manufacture. However, they may also be constructed of other rigid materials, such as machined metal, sheet metal, or other structural materials, such as composites. Preferably, sheets of plastic are vacuum formed, but other plastic shape-forming processes may be used, such as injection molding. The joints 112 may be conveniently formed by solvent bonding, UV welding, or other techniques for joining sheets of formed plastic back to back. In order to maintain the spacing distance between the ends 31 and 33 of each cold drink container 32 and to further rigidify the structure, spacing struts 118 are inserted at multiple locations into depressions 124 which are formed into the partitions at a plurality of locations outside of the channel edges 116, so that the cold drink cans 32 roll freely. The struts are preferably a rigid tubular material cut to a desired size corresponding to the depth of depressions 124 and the top to bottom dimension of the cans 32. The shape of depressions 124 is unique, in that it has a first component 120 and a second component 122. The first component is longer than the second component so that the tubular strut 118 can be tilted in the first longer portion 120, pivoted perpendicular to the wall 108 and then moved into the second shorter component 122. A reduction in space for a ridge is formed at 123 within each depression 124 at second component 122 to hold the tubular strut 118 in place. The ridge 123 is sized so that strut 118 "snaps" into a fixed position. The wall 108 is accurately spaced over its entire area. The position between the opposed channels is established by securely installing struts 118 between each of the walls 108 at a plurality of predetermined locations 126, 128, 130, 132 and 134 therealong.

Figure 6:
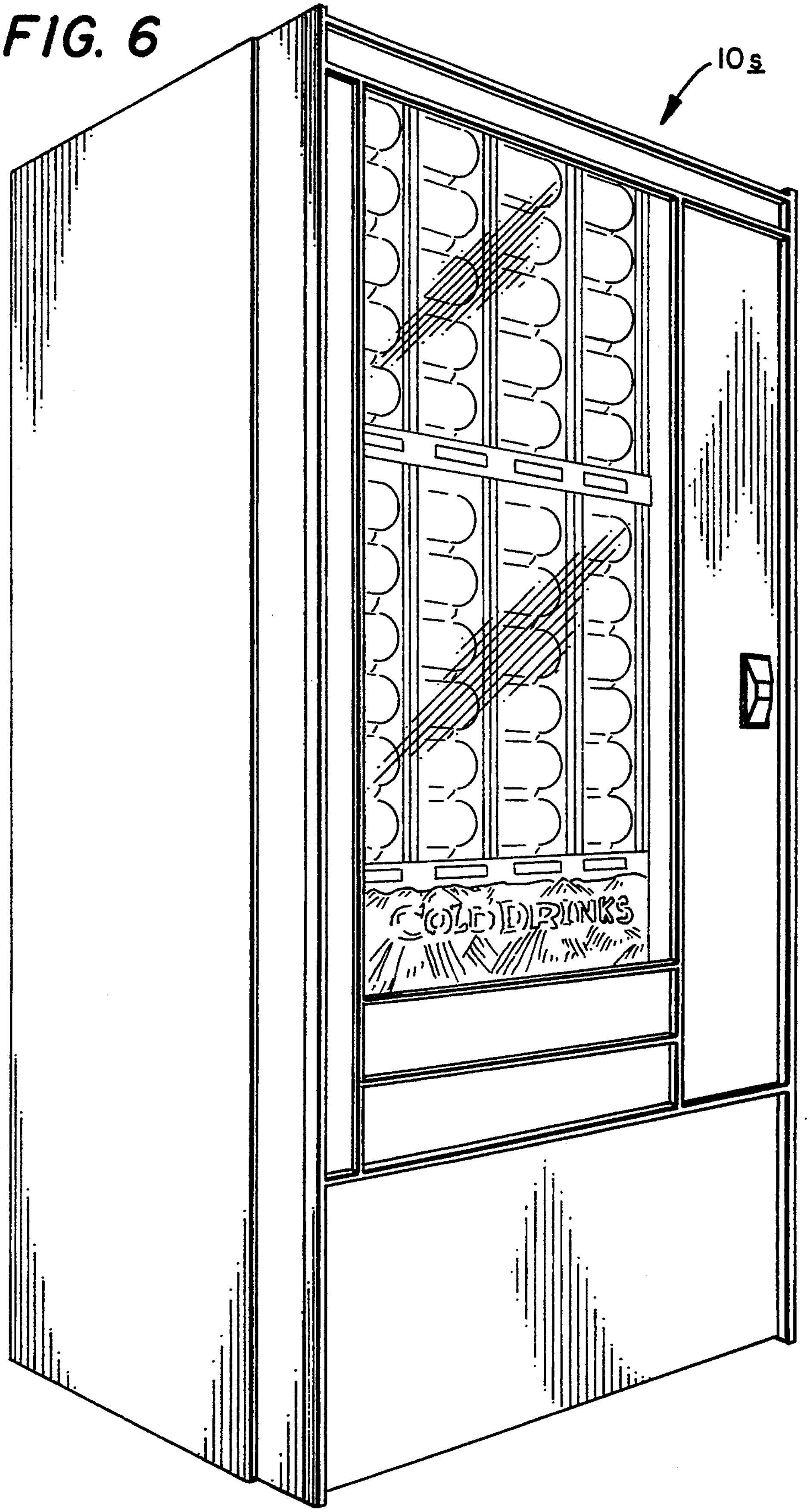
FIG. 6 is a perspective view of an alternative embodiment of a cold drink vending machine slave unit according to the present invention.

FIG. 6 is a perspective view of an alternative embodiment of a cold drink vending machine 105, which is a slave unit. The actuation and vending are controlled from a control panel on a master unit 10, such as that shown in FIGS. 1 or 2.

Figure 8:
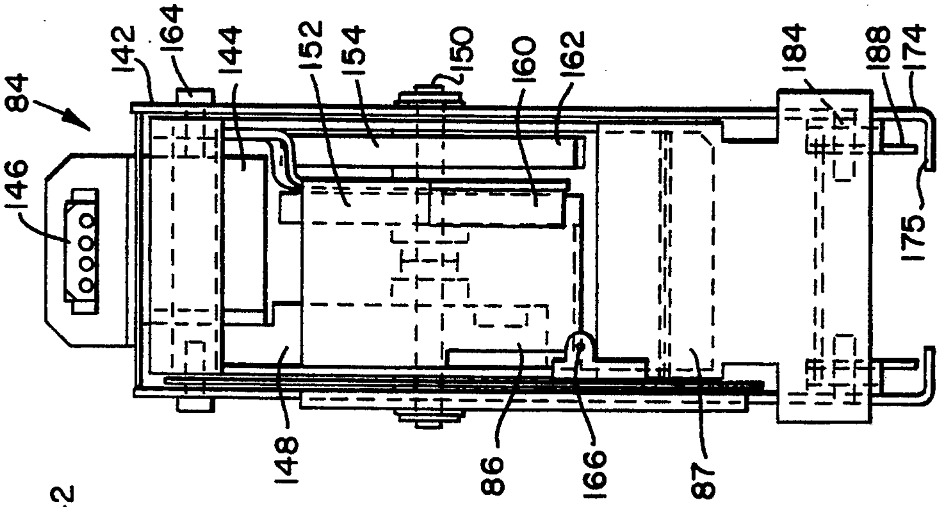
FIG. 8 shows an end view of the escapement mechanism of FIG. 7 viewed from the left end of the escapement mechanism with internal portions thereof shown in hidden lines.
Figure 7:
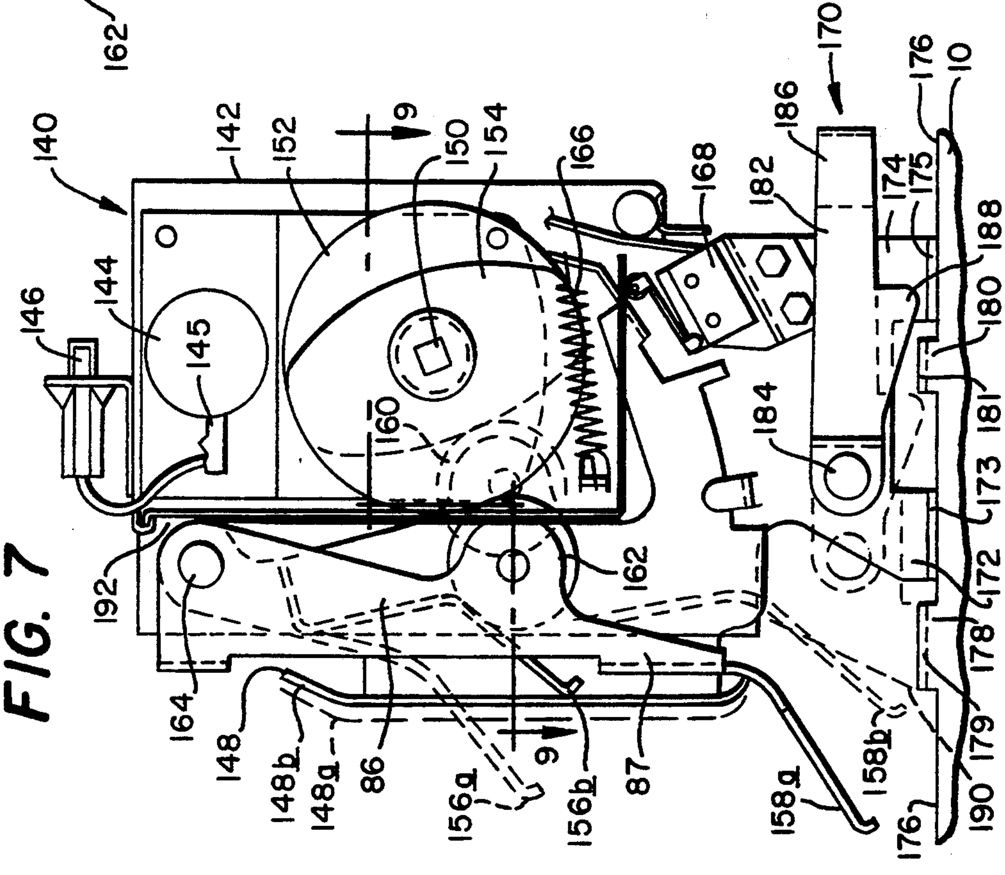
FIG. 7 is a side detail view of a vending machine escapement mechanism with one side cover removed to show interior features thereof and also showing hidden portions with dashed lines and a slidable engagement position indicated with partial phantom lines.

FIG. 7 shows a side view of an escapement mechanism 84 with a cover portion removed to show the escapement mechanism more clearly. An end elevation of the same escapement mechanism 84 is also shown in FIG. 8 looking inward from left to right with respect to FIG. 7. Mounted within frame 142 is a motor and gearbox assembly 144, which in the preferred embodiment will require only a low amount of power which can be supplied through electrical power connection 146. Motor and gearbox assembly 144 incorporates an integral position detection switch 145 which determines the base position of the output shaft of motor and gearbox assembly 144. This switch 145 is provided to facilitate feedback control of the escapement mechanism so that the power to motor and gearbox assembly 144 can be appropriately disengaged after each vending cycle. The output shaft of motor and gearbox assembly 144 is connected to cam axle 150, which rotates during each vending cycle. Preferably, each cycle is 360° so that two identical single lobe cams 152 and 154 can be used offset 180° from each other.

Figure 9:
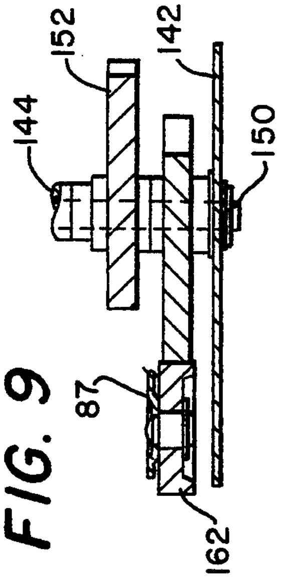
FIG. 9 shows a partial section view taken along section line 9—9 of FIG. 7.

Cam axle 150 is shown in partial detail cross-sectional view in FIG. 9 taken along section line 9-9 of FIG. 7. With reference to FIGS. 7, 8 and 9 together, it will be understood that there is a first offset cam 152 attached for rotation with cam axle 150 and also a second offset cam 154 similarly attached for rotation with cam axle 150 adjacent to first offset cam 152. The first offset cam 152 operates an upstream pivot arm 86 or an upper pivot arm 86 and second offset cam 154 operates a downstream pivot arm 87 or lower pivot arm 87. In operation, pivot arms 86 and 87 move between blocked pathway positions **158*a* and 158*a* , respectively, and retracted positions 156*b* and 158*b*, respectively. Initially, arm 87 is in a blocked position and arm 86 is in a retracted position to allow the column of cylindrical articles 32 to roll downward against arm 158. Subsequently, rotation of cam axle 150 moves first cam 152 against upper roller 160 to move upper arm 86 from retracted position 156*b* to block position 156*a* (shown in phantom lines in FIG. 7) so that both arms 86 and 87 are in blocking positions. With upper arm 86 in blocking position 156*a*, additional rotation of axle 150 maintains upper arm 156 in its blocking position while lower arm 87 is allowed to retract from blocked position 158*a* to retracted position 158*b*, thereby dispensing a single lowest cylindrical article 32*z* with the remainder of the column of cylindrical articles, including and above 32*y*, held by arm 86. Additional rotation continues to maintain upper arm 86 in blocking position 156*a* while lower arm 87 is moved into blocking position 158*a*. Further additional rotation of axle 150 then retracts arm 86 and allows the column of articles, such as cans 32, to move downward against arm 86 until it is fully retracted and the cans 32 are released to roll downward against arm 87 in blocking position 158*a***.

In a 360°vending cycle, the preferred sequence is as follows: home position: upper arm 86 retracted, lower arm 87 blocked; first 90° rotation: arm 86 moves to block, arm 87 remains blocked; second 90° rotation: arm 86 blocks, arm 87 retracts; third 90° rotation: arm 86 blocks; arm 87 returns to block; final 90° rotation: arm 86 retracts, arm 87 blocks; home position. At this point, the position detection switch 145 on motor and gearbox assembly 144 is actuated to signal the end of the vending cycle and disengage power until the next consumer activates the vending mechanism. Once cylindrical articles roll against arm 87, the vending cycle is completed.

The upper arm 86 extends a maximum distance calculated to not contact the cylindrical article when both arms 86 and 87 are at their fully extended blocking positions **156*a* and 158*a*. In this manner, neither upper arm 86 nor lower arm 87 will ever contact the column of cylindrical articles or cans while being raised into their blocking positions so that the power required of the motor and gear assembly 144 is minimized. During retraction action of arms 86 or 87, the weight of the cylindrical articles is in a direction to assist the rotation of motor and gearbox assembly 144. Thus, the maximum power required of motor and gearbox assembly 144 is that required to overcome the rolling friction between cam rollers 162 and 160 against the circular portion of cams 154 and 154 while arm 86 is maintained in a static condition blocking the column of cans. Both upper and lower pivot arms 86 and 87 can be conveniently attached to the same pivot point 164**.

To prevent the consumer from accidentally selecting a product from an empty column, the escapement mechanism incorporates a product detection device, consisting of product sensing cam 148, extension spring 166, and product sensing switch 168. When there are one or more cylindrical articles available for vending, product sensing cam 148 is held in retracted position **148*b* by the cylindrical article, depressing the actuator arm of product sensing switch 168. When the last cylindrical article is vended, extension spring 166 causes the product sensing cam 148 to move to raised position 148*a*, allowing the actuator arm on product sensing switch 168 to lift and signal a "sold out" condition. Product sensing switch 168 is also wired through power input 146**.

As escapement mechanisms 84 are provided at the lower end of each column of cylindrical articles, such as cold drink containers, one or more may be subjected to spillage, breakage, and otherwise particularly harsh operating conditions. Cleaning, repair, or replacement is sometimes required of separate one of the vending mechanisms. For that purpose, escapement mechanisms 84 are uniquely and advantageously provided with a slide mount mechanism 170 by which the escapement mechanism 84 is removably and rigidly engageable with the vending machine 10. Frame 142 is formed with front feet 172 having engaging toes 173 projecting therefrom.

Also, back feet 174 spaced apart from the front feet with engaging toes 175 projecting therefrom. Preferably, there is a pair of front feet 172 and a pair of back feet 174 on each escapement frame 142. The feet and engaging toes engage with a slide track 176 which is formed at an appropriate location within the vending machine cabinet. The slide track 176 includes a pair of front engaging blocks 178 having engaging ears 179 spaced above track 176 a sufficient distance for slip fit engagement with engaging toes 173. Also, there are back engaging blocks 180 with engaging ears 181 supported therefrom spaced above track 176 a sufficient distance for sliding engagement with back engaging toes 175. In order to hold the escapement mechanism 84 rigidly in place, a latch mechanism 182 is provided which has a handle 186 pivotably mounted about a pivot point 184 to move a latch bolt 188 up for clearance above back block 180 and downward into a latch position against back blocks 174. Thus, feet 172 and 180 are placed on track 176 and are slid forward to the position indicated at 190. Latch bolt 188 is then moved with handle 186 into a downward latched position. Removal of the escapement mechanism 84 merely requires that the operator raise handle 186 to disengage latch bolt 188 and then slide the mechanism rearward out of engagement so that it can be lifted and removed for cleaning, servicing, or replacement. Conveniently, power attachment 146 is in the form of a socket 146, so that complete removal and disengagement from a power source, from control circuitry, and from a product sensing device can be easily and conveniently accomplished.

To reduce the amount of cleaning, repair and replacement, the entire cam mechanism of escapement 84 is enclosed within a closure case 192, having a portion thereof fitting between the pivot arms and the motorized cam mechanism with only a sufficient open area for movement of rollers 160 and 162 through the closure case 192 for engagement with cams 152 and 154.

Figure 10:
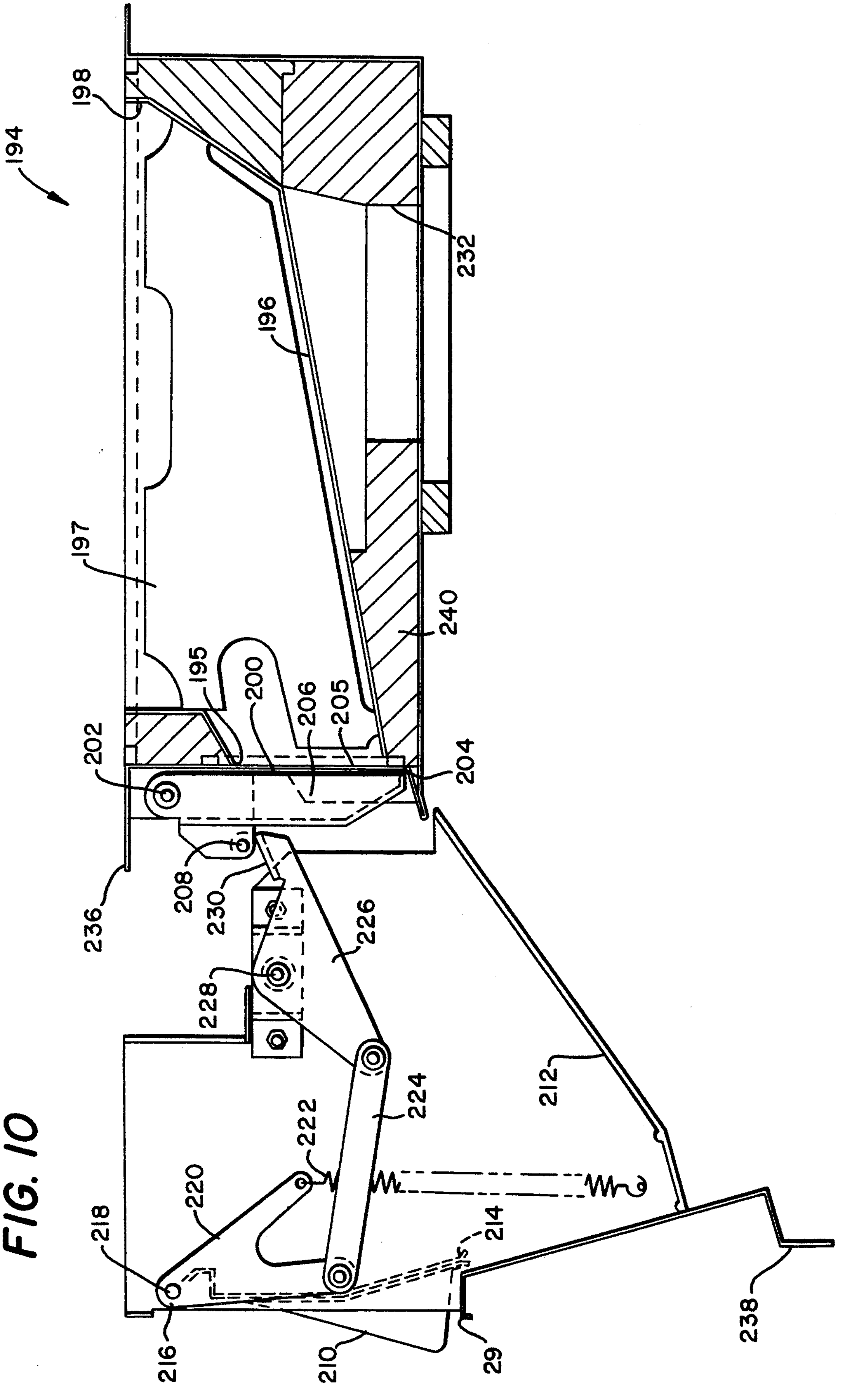
FIG. 10 shows an enlarged partial side detail of a vending trough, insulated door, and mechanically actuatable access door into the dispensing chute according to the present invention.
Figure 11:
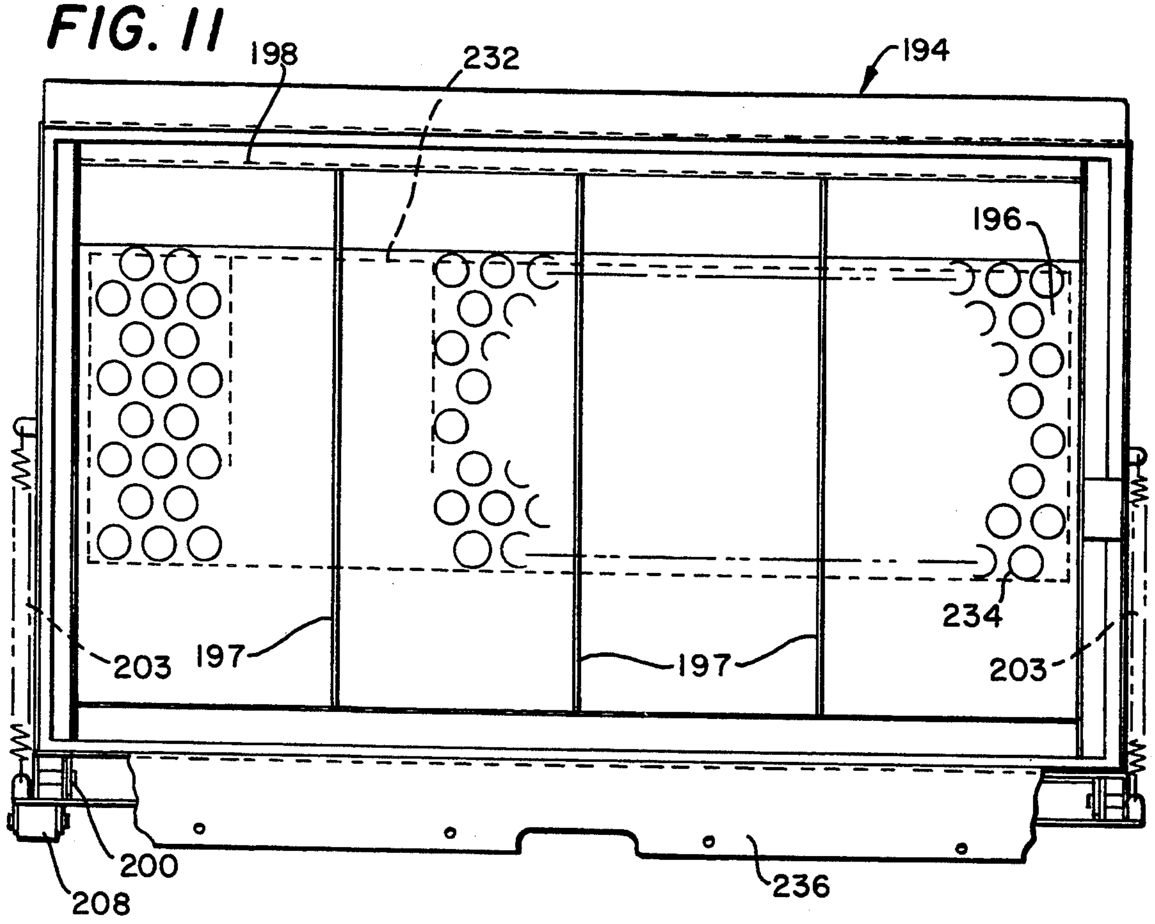
FIG. 11 is a partial top plan detail view of the vending chute and insulated door mechanism of FIG. 10.

FIG. 10 depicts an enlarged partial cross-sectional view of a dispensing trough mechanism 194 shown separated from the escapement mechanism 84 of the vending machine 10 as shown in FIG. 3. Also, additional understanding will be had with reference to FIG. 11 which is a partial top detail view of the dispensing trough 194 of FIG. 10. An angled tray 196 is positioned below a receiving opening 198. Opening 198 is below and receives dispensed articles from escapement mechanism 84 thereabove (as shown in FIG. 3). Preferably, a plurality of escapement mechanisms 84 vend cylindrical containers from a plurality of tracks. Advantageously, partitions 197 are provided along tray 196 to guide the cylindrical containers so that they roll without twisting, which would cause them to stop rolling. The cylindrical articles roll along tray 196 to a discharge opening 195 and against insulated door 200 which is hinged at 202 and spring-loaded as with spring 203 against seal 204 around discharge opening 195 of trough 194. Door 200 may be constructed of a durable plastic material exterior layer 205 having an interior insulation core 206 with desired combined thickness and insulative characteristics to provide adequate insulation for maintaining the interior of the vending machine cabinet at a desired cool temperature with minimum energy consumption. A substantially thick door 200 is thus provided which would normally require either a very steeply angled tray 196 or a very heavy cylindrical article 32, or both, to actuate it to an open position. The cylindrical article could easily become stuck within dispensing trough 194, where it could not be reached by the consumer. However, door 200 is uniquely and advantageously constructed with an offset actuation roller 208 which is mechanically operated upon opening of manual access door 210, which corresponds to openable door 27. It has been found that a plurality of smaller doors (not shown) at each guided portion of tray 196 between the partitions 197 allows the momentum of one can to move the smaller doors opened. However, mechanical opening of a single larger door 200 as shown is preferred to insure proper opening while providing good insulation.

Figure 12:
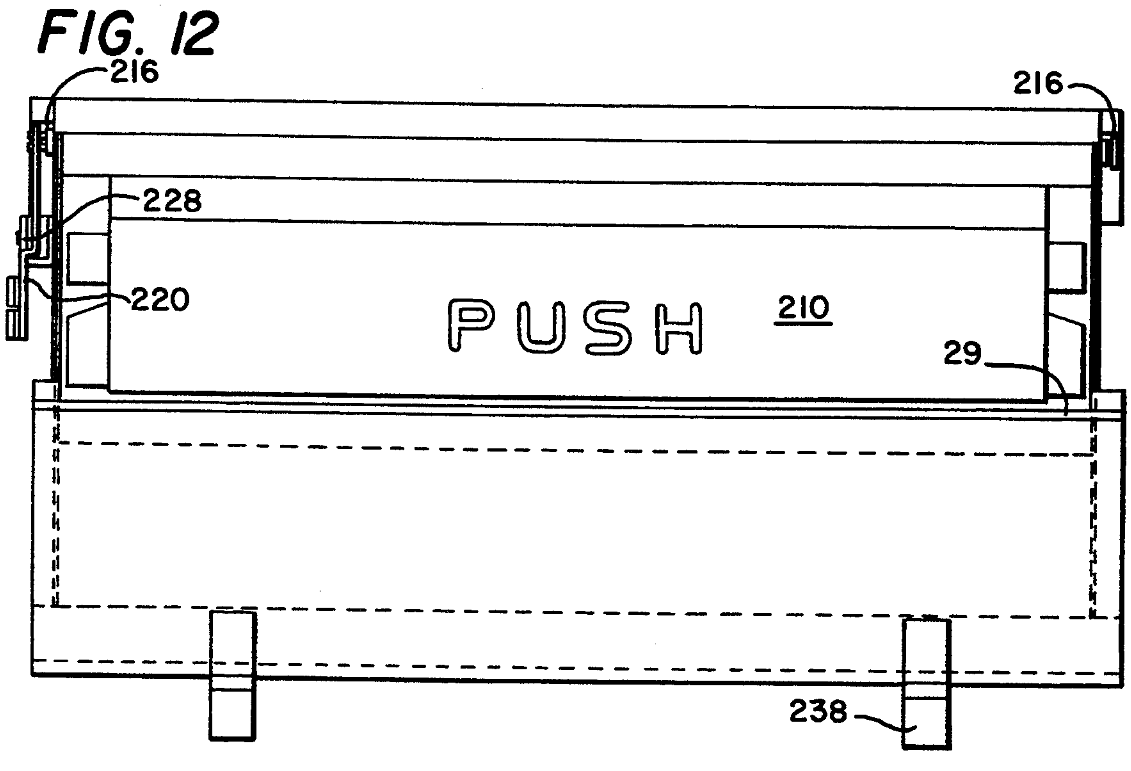
FIG. 12 is a front elevation detail view of the manually actuatable access door of FIG. 10.

Greater understanding of the mechanism by which door 210 actuates door 200 through roller 208 will be had with reference to FIG. 10 in combination with reference to FIG. 12. FIG. 12 is a front elevation detail view of the door 210 and access chute 212. Thus, in FIG. 10, it will be observed that access door 210 is pivoted about its hinge at 216 to allow access through access opening 29 into delivery chute 212. A drive bar 218 is rigidly attached to pivot with door 210, which drive bar 218 may be a square or rectangular bar. Bar 218 is rotated about hinge point 216 and upon pushing door 210 engages and rotates lever 220. Lever 220 is connected to spring 222 to hold door 210 into a normally closed position. A flexible sealing flap 214 is positioned to move with door 210 and to act as a barrier against free circulation of air when door 210 is closed. Upon pushing door 210, not only is delivery obtained to chute 212, but also lever 220 is rotated and acts through linkage 224 to actuate cam 226 so that it pivots about pivot point 228. Upon pivoting about pivot point 228, pawl 230 of cam 226 lifts upward against actuation roller 208 and opens door 200. Thus, after a cylindrical article has been vended, it falls onto tray 196 and rolls against door 200 where it is temporarily stopped. When the consumer manually pushes on door 210, force is also provided to open door 200. The dispensed cylindrical article rolls into delivery chute 212 where the consumer can easily reach and remove the vended product.

It will also be seen that this construction conveniently allows temperature controlled air to be injected (as with fan 231 of FIG. 3) through cooling conduit 232 and through orifices 234 formed in angled tray 196. Trough 194 is connected to the bottom of the vending cabinet through connection brackets 236. Door mounting brackets 238 are similarly used to mount door 210 and delivery chute 212 with its cam-operated mechanism at a lower portion of the front panel of the vending machine. The entire cabinet can be maintained with minimum energy expended for temperature control by providing insulation 240 around the entire dispensing trough 194.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A vending mechanism for a cylindrical article dispenser of a type having a column of stacked cylindrical articles moved along a dispensing pathway by a force, such as by the force of gravity, said vending mechanism comprising:

(a) an escapement mechanism attachable in operative alignment with a vending pathway of a column of stacked cylindrical articles;

(b) an upstream arm pivotably attached to said escapement mechanism, having a first position blocking a portion of said vending pathway and having a second position retracted from said vending pathway to allow cylindrical articles to move past said upstream arm;

(c) a downstream arm pivotably attached in said escapement mechanism, having a first position blocking a portion of said vending pathway and having a second position retracted from said vending pathway to allow cylindrical articles to move past said downstream arm;

(d) a first rotary cam rotatably attached in said escapement mechanism having a profile shape for moving said upstream arm between its first and second positions;

(e) a second rotary cam coaxially rotatable with said first cam and having a profile shape for moving said downstream arm between its second position and its first position; and (f) said first and second rotatable cams having their profile shapes offset with respect to each other so that said upstream arm is moved into its blocking position only when said downstream arm is also in its blocking position, and so that said downstream arm is moved into or out of its blocking position only when said upstream arm is in its blocking position, such that co-rotation of said cams does not act to raise either said upstream or said downstream arm against said force which causes said column to move along said dispensing pathway.

2. A vending mechanism as in claim 1 further comprising:

(a) a holding mechanism pivotably attached at each stacked column of cylindrical articles positioned for mechanically blocking the path of the articles at a position above the escapement mechanism; and (b) a removably engageable slide mount formed on the escapement mechanism for removably holding the escapement mechanism in operative rigid alignment with the path of the cylindrical articles.

3. A vending mechanism as in claim 1 further comprising:

(a) an insulated door against which cylindrical articles are released by the escapement mechanism, which insulated door has a closed position and an open position;

(b) a delivery chute positioned for receiving cylindrical articles from said insulated door in its open position;

(c) a manually openable access door having a first closed position denying access to the delivery chute and a second open position permitting access to the delivery chute; and (d) a cam actuation mechanism interconnected between said manually openable access door and said insulated door for mechanically opening said insulated door upon manual opening of said access door.

4. A vending mechanism as in claim 1 wherein said column of stacked cylindrical articles comprises a column of cold drink containers.

5. A vending mechanism as in claim 1 wherein said column of stacked cylindrical articles comprises a column of cold drink cans.

6. A vending mechanism as in claim 1 wherein said column of stacked cylindrical articles comprises a column of cold drink bottles.

7. A vending mechanism as in claim 1, further comprising:

(a) a cam axle to which said first and second rotary cams are affixed in offset positions for co-rotation therewith; and (b) a motor actuatable to rotate said axle through a vending rotation cycle such that said first and second rotary cams engage said upstream and downstream arms, which vending rotation cycle first acts to move said upstream arm to its blocking position when said downstream arm is in its blocking position, second acts to keep said upstream arm in its blocking position and to move said downstream arm to its retracted position vending a cylindrical article third acts to keep said upstream arm in its blocking position and downstream arm in its blocking position, fourth acts to move said upstream arm to its retracted position while said downstream arm is in its blocking position.

8. A vending machine as in claim 7 wherein said vending rotation cycle comprises 360° cam rotation and each of said first, second, third, and fourth acts of said vending cycle correspond to approximately 90° rotation during said 360° vending rotation cycle.

9. A vending mechanism as in claim 7 further comprising:

(a) a first roller on said upstream arm rollingly engaged with the profile shape of said first cam by which said upstream arm is actuated by said first cam; and, (b) a second roller on said downstream arm rollingly engaged with said profile shape of said second cam by which said downstream arm is actuated by said second cam.

10. An escapement mechanism for use in a machine for vending cylindrical product containers one at a time from one end of a track which provides a product container pathway for a column of a plurality of cylindrical product containers, said escapement mechanism comprising:

(a) a frame attached in said vending machine adjacent to said one end of said track;

(b) an upstream arm pivotably attached to said frame having one position blocking said pathway of product containers within said track and another position retracted from said blocking position;

(c) a downstream arm pivotably attached to said frame having a holding position blocking said pathway of product containers downstream from said upstream arm a distance corresponding to one cylindrical product container and a release position retracted from said pathway;

(d) a cam axle rotatably driven in said frame by a motor;

(e) a first cam attached for rotation with said cam axle and having a perimeter shape defining a substantially constant radius portion for more than 180° around said perimeter and a decreasing radius portion for less than 90° around said perimeter and an increasing radius portion for less than 90° around said perimeter, which cam is operatively engaged with said upstream pivot arm for holding said arm in said blocking position around said constant radius, for moving said upstream arm to said retracted position around said decreasing radius and for moving said upstream arm to said blocking position around said increasing radius;

(f) a second cam attached for rotation with said cam axle and having a perimeter shape defining a substantially constant radius portion for more than 180° around said perimeter and a decreasing radius portion for less than 90° around said perimeter and an increasing radius portion for less than 90°around said perimeter, which cam is operatively engaged with said downstream pivot arm for holding said downstream pivot arm in said holding position around said constant radius, for moving said downstream arm to said release position around said decreasing radius and for moving said downstream arm to said holding position around said increasing radius;

(g) said second cam perimeter shape offset from said first cam perimeter shape by 180° so that upon rotation of said cam axle through a rotation cycle of 360°, a first 90° rotation acts to move said upstream arm to its blocking position when said downstream arm is in its blocking position, a second 90° rotation acts to hold said upstream arm in its blocking position and said downstream arm is moved to its retracted position, a third 90° rotation acts to hold said upstream arm in its blocking position and moves said downstream arm back to its blocking position, a fourth 90°0 rotation acts to move said upstream arm to its retracted position while said downstream arm is in its blocking position, before repeating said 360°0 rotation cycle.

11. An escapement mechanism as in claim 10 wherein said cylindrical product containers are cold drink containers.

12. An escapement mechanism as in claim 10 wherein said cylindrical product containers are cold drink cans.

13. An escapement mechanism as in claim 10 wherein said cylindrical product containers are cold drink bottles.

14. A delivery door mechanism for use in vending a cylindrical article from inside a temperature controlled cabinet to outside of a cabinet, comprising:

(a) an angled tray attached to said temperature controlled cabinet for receiving cylindrical articles and rolling them to an opening at a lower end of said angled tray;

(b) an insulated door biased closed against said opening at said lower end of said angled tray, which insulated door is mechanically openable to allow said cylindrical article to roll out of said opening at said lower end of said angled tray;

(c) a normally closed delivery chute positioned adjacent said insulated door for receiving articles from said opening;

(d) an access door manually openable from outside of said cabinet to open said normally closed delivery chute to gain access thereinto; and (e) mechanical linkage operatively connected between said access door and said insulated door to actuate said insulated door to an open position upon manually opening said access door thereby allowing said cylindrical article to enter said delivery chute to which access is obtained through said access door.

15. A delivery door mechanism as in claim 14 wherein said cylindrical article to be vended is a cold drink container.

16. A delivery door mechanism as in claim 14 wherein said cylindrical article to be rended is a cold drink can.

17. A delivery door mechanism as in claim 14 wherein said cylindrical article to be vended is a cold drink bottle.

18. A delivery door mechanism as in claim 14 wherein said vending machine has a plurality of columns of cylindrical articles to be vended and from within said cabinet and said angled tray is positioned for receiving articles from each of said columns and further includes partitions directed along said tray for guiding said cylindrical articles rollingly down said angled tray without twisting.

19. A delivery door mechanism for use in vending a cylindrical article from a plurality of columns inside a temperature controlled cabinet to outside of a cabinet, comprising:

(a) an angled tray attached to said temperature controlled cabinet for receiving cylindrical articles;

(b) a plurality of partitions along said angled tray separating it into a plurality of paths for receiving cylindrical articles from separate ones of said plurality of columns of articles;

(c) a plurality of openings at lower ends of said separate paths along said angled tray;

(d) a plurality of insulated doors biased closed against said openings at said lower ends of said separate paths along said angled tray, which insulated doors pivot open by impact momentum of a rolling cylindrical article to allow said cylindrical article to roll out of said opening at said lower end of said angled tray;

(e) a normally closed delivery chute positioned adjacent said insulated doors for receiving articles from said openings; and (f) an access door manually openable from outside of said cabinet to open said normally closed delivery chute to gain access thereinto.

* * * * *